May 28, 1957 A. C. JURGENS 2,793,482
ROCK PICKER HAVING MOVABLE PICKING TEETH
Filed Aug. 16, 1954 6 Sheets-Sheet 1

INVENTOR.
Adolph C. Jurgens
BY
Strukwells
Atty.

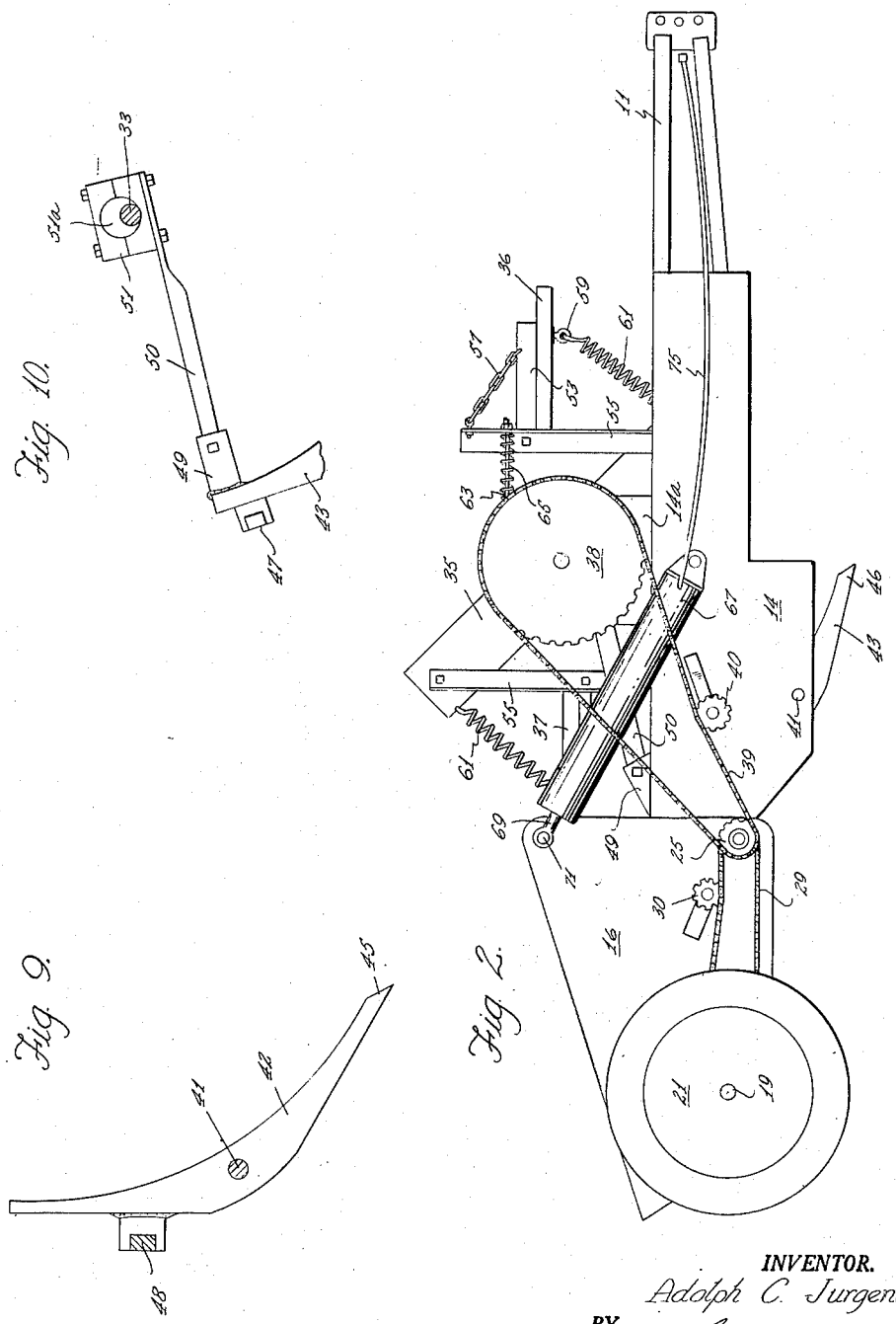

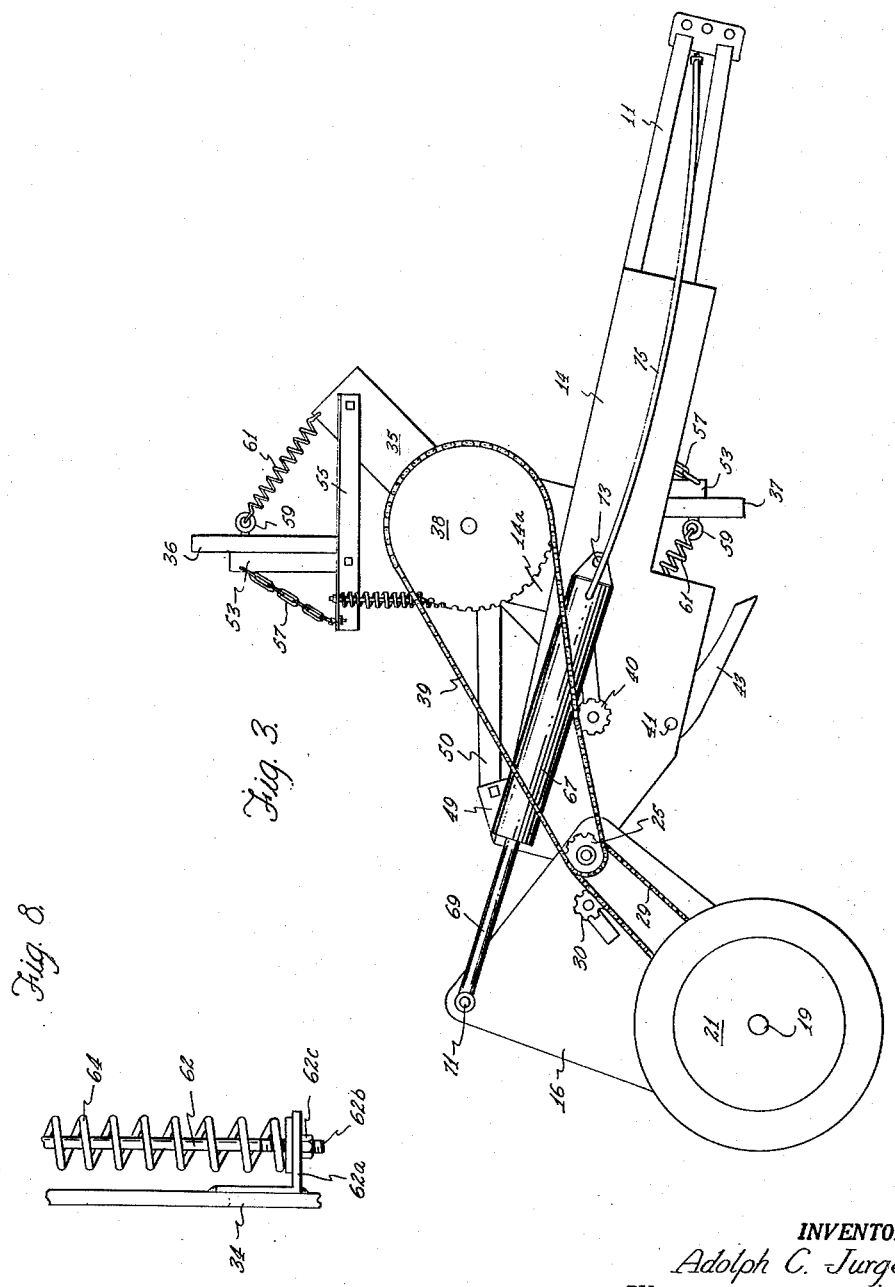

May 28, 1957 A. C. JURGENS 2,793,482
ROCK PICKER HAVING MOVABLE PICKING TEETH
Filed Aug. 16, 1954 6 Sheets-Sheet 4
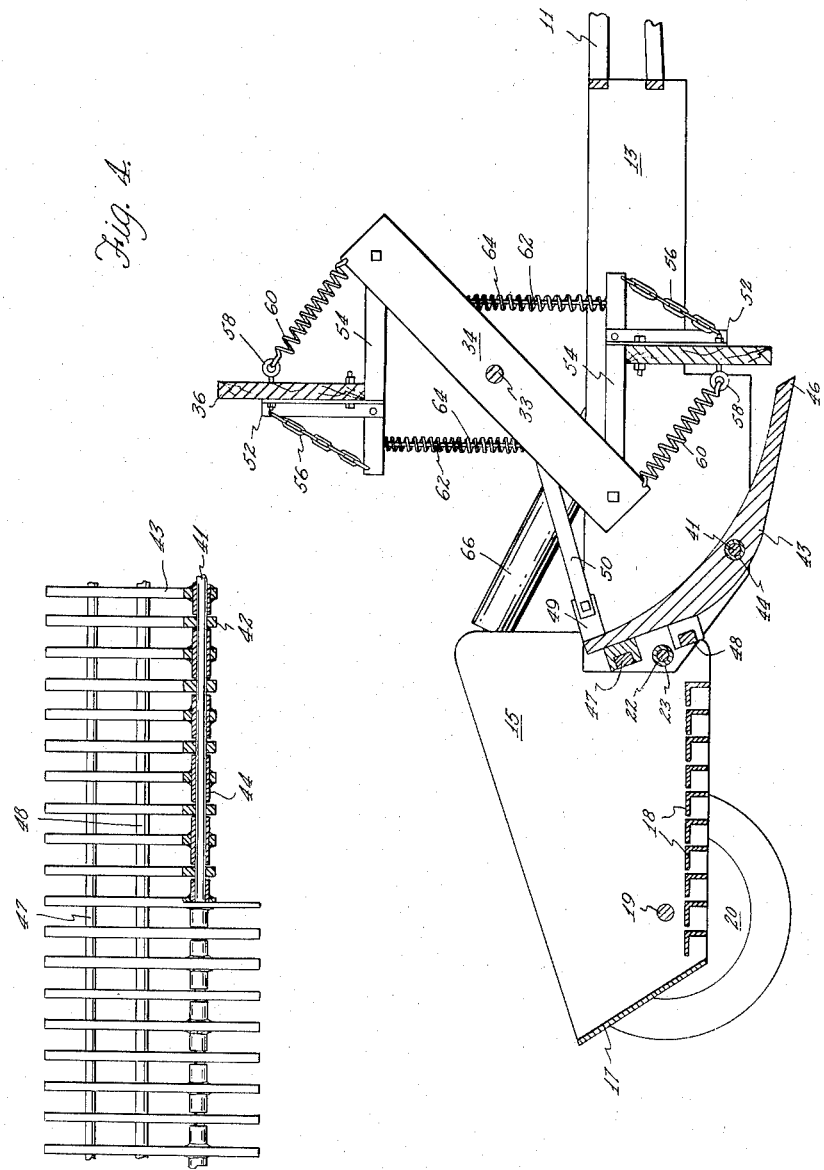
INVENTOR.
Adolph C. Jurgens
BY
Atty.

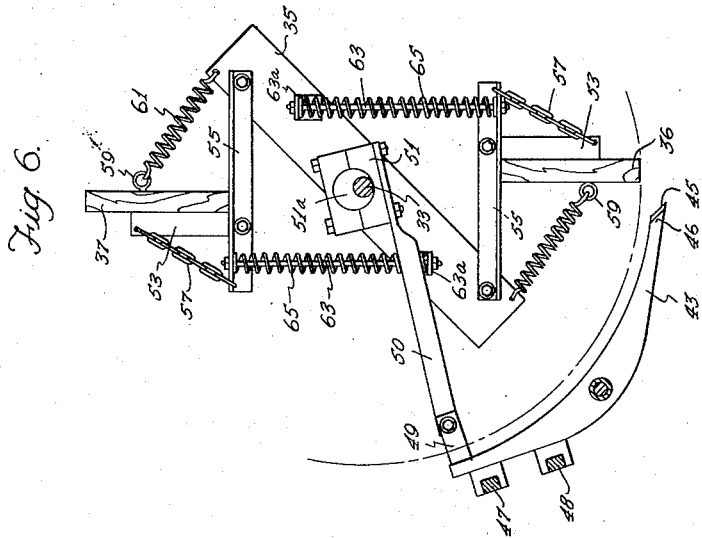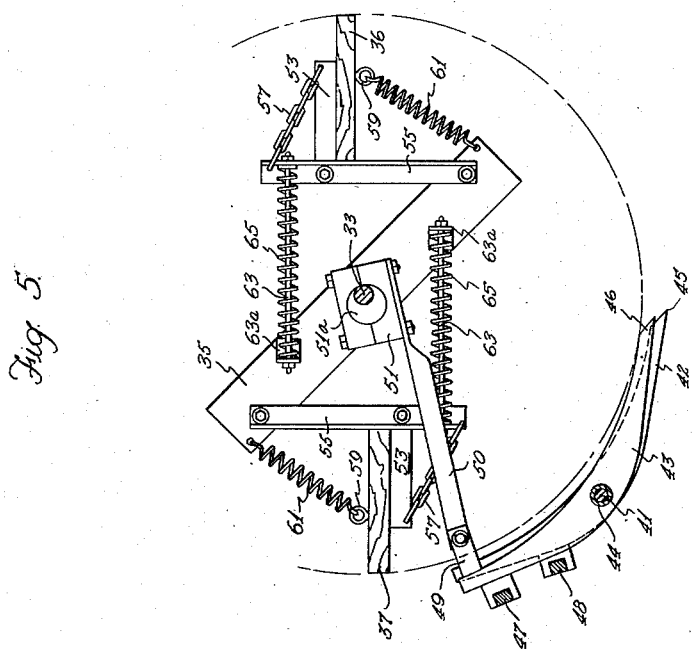

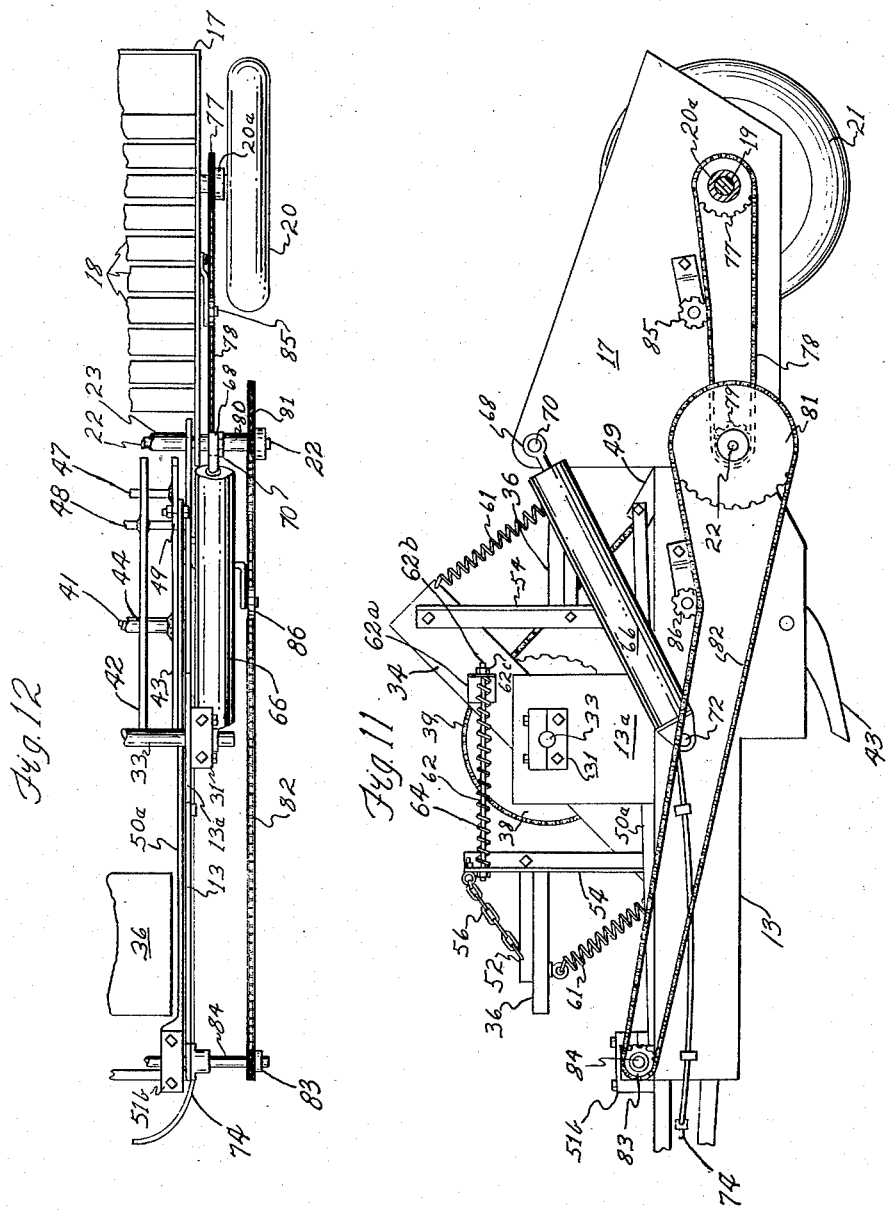

United States Patent Office 2,793,482
Patented May 28, 1957

2,793,482
ROCK PICKER HAVING MOVABLE PICKING TEETH

Adolph C. Jurgens, Athol, Idaho

Application August 16, 1954, Serial No. 450,026

10 Claims. (Cl. 55—17)

My invention relates to a rock picker. It is the principal purpose of my invention to provide a machine for picking the rocks off cultivated fields wherein the rocks which project from the surface of the ground are swept over a series of teeth that have points running slightly submerged in the ground, and the sweeping device and teeth are so arranged as to have relative movement of one tooth with respect to the adjacent teeth and with respect to the sweeping device whereby to prevent wedging of the rocks at any point in their travel.

It is the purpose of my invention to provide a rock picking machine wherein the rocks are swept over picking teeth into a container at the rear of the teeth with means whereby the container may be dumped in a simple and efficient manner. In this connection my invention contemplates a rock picking machine wherein the picking portion and the container portion are pivoted together at the front end of the container portion and the container is wheel mounted at its rear portion so that by elevating the point of pivotal connection between the picking mechanism and the container, the container is tipped about its mounting on the wheels so as to dump the rocks therein rearwardly.

It is a further purpose of my invention to provide a rock picking machine of the character described with a novel sweep mechanism for sweeping the rocks over the teeth that pick the rocks out of the soil, which mechanism provides a yielding resilient support of the sweep elements that will cause the sweep elements to ride over any obstruction that is too great for the sweep elements to push without damaging the machine.

The nature and advantages of my invention will appear more fully from the following description and the accompanying drawings wherein a preferred form of the invention is shown. It should be understood, however, that the drawings and description are illustrative only and are not intended to limit the invention except insofar as it is limited by the claims.

In the drawings:

Figure 2 is a view in side elevation of the machine showing it in rock picking position;

Figure 3 is a view similar to Figure 2 but showing the machine in rock dumping position;

Figure 4 is a longitudinal sectional view through the machine taken substantially on the line 4—4 of Figure 1;

Figures 5 and 6 are fragmentary sectional views taken substantially on the line 5—5 of Figure 1, illustrating the relative positions of the picking teeth and the sweep members as the teeth are moved with respect to each other;

Figure 7 is a fragmentary plan view, partly in section, of the rear ends of the picking teeth showing how they are connected to each other;

Figure 8 is an enlarged detailed view illustrating the mounting of one of the springs that supports a sweep member on the sweep member carrying frame;

Figure 9 is an enlarged side view of one of the picking teeth showing its connection to the supporting cross members;

Figure 10 is a detailed view showing the connection of the movable picking fingers to the sweep shaft;

Figure 11 is a view in side elevation of a modified form of the invention; and

Figure 12 is a fragmentary plan view showing the modified form.

Figure 1:
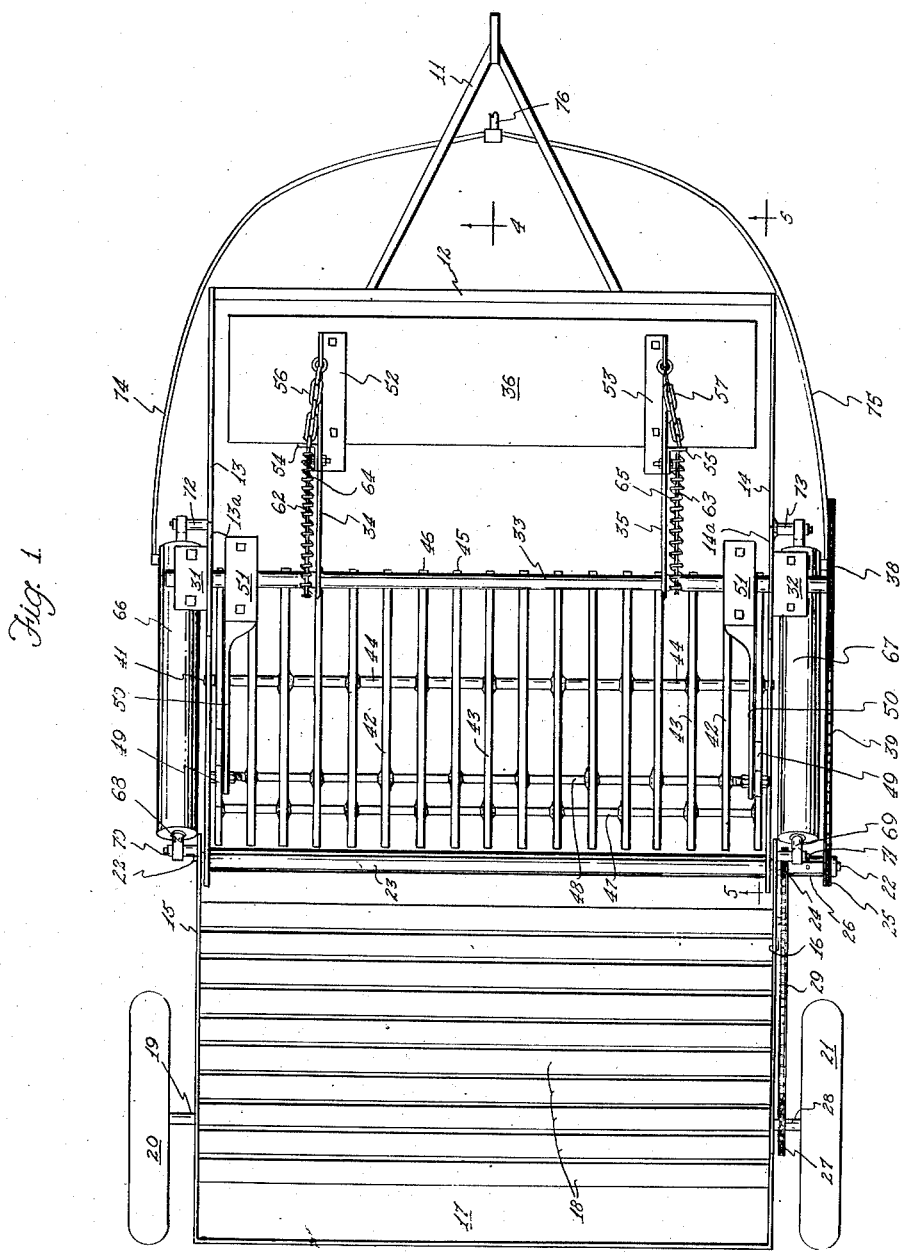
Figure 1 is a plan view of my improved rock picking machine with a portion of the sweeping device broken away to illustrate the picking teeth.

Referring now in detail to the drawings, my improved rock picking machine comprises a front hitch portion 11 which is adapted to be attached to a towing vehicle of any suitable type. The hitch portion 11 connects to a cross frame member 12 which is located at the front of two side frames 13 and 14 which are made of heavy steel plate. The side frame members extend rearwardly and overlap with two side frame members 15 and 16 which form the sides of a container for the rocks that are picked up. The container has a rear cross wall 17 of steel plate and a bottom composed of angle irons 18. The cross frame member 12, the side frame members 13 and 14 with other connecting members between the side frames 13 and 14, provide a framework for the parts that pick up the rocks and move them into the container.

The container, made up of the side frames 15 and 16, the rear cross wall 17 and angle irons 18, is mounted on an axle 19 which is supported by wheels 20 and 21. The container is free to pivot on the axle 19 so that it can be raised at the front to dump the rocks whenever desired.

The side frames 13 and 14 are pivoted on a cross bar 22 which extends from side frame 15 to side frame 16 and is secured in these frames. A tube 23 connects the side frames 13 and 14 and is rotatably mounted on the cross bar 22. The cross bar 22 extends beyond the side frame 16 and provides mounting for two sprocket wheels 24 and 25 that are joined together by a common hub 26 so as to rotate as a unit. The wheel 21 has a sprocket wheel 27 secured by a hub 28 to the wheel so as to rotate on the axle 19 as the wheel 21 is rotated. A sprocket chain 29 connects the sprocket wheels 24 and 27 and an idler sprocket 30 is mounted on the side frame 16 to keep the sprocket chain 19 tight.

The side frames 13 and 14 have upstanding portions 13a and 14a which mount two bearing blocks 31 and 32 for a drive shaft 33. The drive shaft 33 carries two cross bars 34 and 35 which in turn support sweep members 36 and 37. The shaft 33 is driven by a large sprocket wheel 38 which is fixed thereto and which is connected by a sprocket chain 39 to the sprocket wheel 25. An idler sprocket 40 is mounted on the side frame 14 to keep the sprocket chain 39 tight.

A cross bar 41 extends between the side frames 13 and 14 and is secured thereto adjacent the lower edges of these frames and at a short distance in front of the cross bar 22. The cross bar 41 carries a multiplicity of fixed picking teeth 42 and movable rock picking teeth 43. The rock picking teeth 43 have pipe sections 44 welded to them and projecting on both sides of them to provide pivotal mounting of these teeth on the cross bar 41 and to provide space means to hold the several teeth 42 and 43 at the proper spacing from each other. The teeth 42 and 43 are essentially the same in shape. They have digging points 45 and 46 respectively and on their top surfaces they curve rearwardly and upwardly about the shaft 33 as an axis to terminate substantially at the top rear edges of the side plates 13 and 14. The teeth 43 are connected adjacent their top rear ends by a cross bar 47 and the teeth 42 are connected by a cross bar 48 in the same manner. The cross bar 48 is extended to and secured to the side plates 13 and 14 but the cross bar 47 terminates at the two outer teeth 43.

The two outer teeth 43 have ears 49 thereon and these ears are pivoted to links 50 which extend forwardly and are secured to bearing blocks 51. The bearing blocks 51 fit over cams 51a which are mounted upon and fixed to the shaft 33. As the shaft 33 rotates it is evident from an inspection of Figures 5 and 6 that the teeth 43 will be caused to rock between a position where their digging tips 46 are above the digging tips 45 of the teeth 42 and a lowered position where they extend below the tips of the teeth 45. This slow rocking movement of the teeth 43 keeps the points 46 moving up or down with respect to the points 45 so as to prevent rocks from wedging between the teeth 42 and 43 and to keep the rocks moving up along the top surface of the teeth.

Referring now to the sweep members 36, which are carried by the cross bars 34 and 35, these sweep members are preferably wooden bars or similar bars that may be readily replaced. Each bar 36 or 37 is secured to two arms 52 and 53. The arm 52 is pivoted to another arm 54 and the arm 53 is pivoted to an arm 55. The arms 54 and 55 are in turn pivoted to the cross bars 34 and 35. A flexible connector 56 extends from the point adjacent the outer end of the arm 52 to the free end of the arm 54. A like flexible link 57 extends from a point adjacent the outer end of the arm 53 to the free end of the arm 55. The arms 52—55 are preferably angle irons as shown. These flexible members 56 and 57 are preferably chains. On the opposite face of each sweep member 36 from the angle irons 52 and 53, I provide eyes 58 and 59 into which springs 60 and 61 are hooked. The springs 60 and 61 extend forwardly to the free ends of the cross bars 34 and 35 and are hooked into the ends of these cross bars. The angle iron 54 is linked to the cross bar 34 by a tie rod 62, an angle iron bracket 62a being welded to the cross bar 34 as illustrated in Figure 8, to receive the tie rod 62. The tie rod 62 is adjustable in length by means of a threaded end 62b thereon and a nut 62c. A spring 64 is under compression between the angle iron 54 and the bracket 62a and encircles the tie rod 62 so as to tend to force the angle iron 54 to turn forwardly about its pivot to the cross bar 34. A tie rod 63 is mounted in a similar fashion between the angle iron 55 and the cross bar 35 and a spring 65 surrounds the tie rod 63 and is under compression like the spring 64. The tie rods 62 and 63 are free to slide through the angle irons 54 and 55 and the brackets 62a and 63a if the sweep members 36 encounter excessive resistance in rotating. The cross bars 34 and 35 are of course, fixed to the shaft 33 so as to rotate with this shaft.

It will be noted that if excessive pressure is exerted rearwardly on a sweep member 36, the sweep member moves rearwardly and inwardly toward the shaft 33 about the pivot of the angle irons 54 and 55 to the cross bars 34 and 35. Thus the sweep members 36 can quickly rise over a rock or other obstruction without damaging the cross bars 34 and 35 and without excessive overload on the shaft 33.

The dump mechanism by which the rocks collected in the container, composed of the side frames 15 and 16, the rear cross plate 17 and the floor members 18, are dumped comprises two hydraulic jacks 66 and 67. These jacks have their piston rods 68 and 69 pivoted on posts 70 and 71 that are secured to the side plates 15 and 16. The cylinders 66 and 67 are pivoted on the posts 72 and 73 which are fixed to the side frames 13 and 14. The posts 70 and 71 are positioned at the top front corners of the side plates 15 and 16 so that the jacks extend upwardly and rearwardly from the posts 72 and 73 to the posts 70 and 71. Fluid under pressure is supplied to the cylinders 66 and 67 through flexible leads 74 and 75 and a common lead 76 which extends forward to the towing vehicle and which is supplied from a pump or other source of fluid under pressure (not shown).

When the machine is picking up rocks the rotation of the wheel 21 will cause the shaft 33 to be rotated so that the sweep members 36 will turn in the direction indicated by the arrows on Figures 2 and 4 of the drawings so that each sweep member moves rearwardly over the teeth 42 and 43 at intervals and pushes the rocks picked up by the teeth rearwardly over the rear ends of the teeth where the rocks fall onto the floor members 18. As the shaft 33 turns the sweep members 36, it also rotates the cams 51a so as to rock the teeth 43 in timed relation to the movement of the sweep members over the teeth 42 and 43. This action is illustrated best in Figures 5 and 6 where the position of the parts is shown just as a sweep member is leaving the upper ends of the teeth 42 and 43 and in Figure 6 a sweep member is approaching the teeth 42 and 43. The relation is such that the rocking of the teeth 43 does not in any way interfere with the passage of the sweep members 36 over the points of the teeth and it is possible to have the sweep members 36 travel closely to the points of the teeth as they pass over the points in order to pick up the rocks.

Under certain conditions it is desirable to have the points of the movable teeth move up and down rather rapidly. For example, in certain soft ground where the rocks to be picked up are rather large, they may cause the drive wheel 21 to slide rather than to turn the sweep members and rock the teeth. The modified construction shown in Figures 11 and 12 provides a relatively high speed drive means for the movable teeth which is separate from the shaft that carries the sweep members.

In Figures 11 and 12 the machine construction is essentially the same as in the main form of the invention. However, in this instance the wheel 20 has a sprocket wheel 77 fixed on its hub 20a. This sprocket wheel 77 drives a sprocket chain 78 that in turn drives a small sprocket wheel 79 which has its hub 80 journalled on the cross bar 22. A larger sprocket wheel 81 is also fixed on the hub 80. The sprocket wheel 81 drives a sprocket chain 82 that in turn drives a small sprocket wheel 83 that is fixed on a cam shaft 84. The shaft 84 is rotatably mounted on the side frames 13 and 14 in front of the sweep members 36. Due to the relative sizes of the sprocket wheels 77, 79, 81 and 83, the shaft 84 will rotate several times for each complete turn of the wheel 20.

The movable teeth 43 are connected by elongated links 50a to bearing blocks 51b. These bearing blocks fit over cams (not shown) on the shaft 84 that are like the cams 51a of the main form of the invention. Idler sprockets 85 and 86 are used to take up the slack in the chains 78 and 82.

The operation of the modified form of my invention is substantially the same as the main form except for the changed mechanism that rocks the movable teeth 43.

It is believed that the nature and advantages of my invention will be clear from the foregoing description.

Having thus described my invention, I claim:

1. In a machine for picking up objects such as rocks from the ground, a supporting framework, a plurality of spaced apart picking teeth supported on said frame, said teeth having digging points adapted to enter the ground and lift objects on the ground, said teeth being curved upwardly away from the points, a sweep member mounted on said framework above the teeth for rotation over the tops thereof to sweep objects lifted by the digging points upwardly over the teeth, means to collect the objects swept over the teeth, drive means for rotating the sweep member, said teeth comprising alternate fixed teeth and movable teeth, the movable teeth being pivotally supported by the framework on an axis remote from the digging points for movement up and down at their digging points with respect to the fixed teeth, said drive means being connected to the movable teeth to move them up and down as the sweep member rotates.

2. In a machine for picking up objects such as rocks from the ground, a supporting framework, a plurality of spaced apart picking teeth supported on said frame, said teeth having digging points adapted to enter the ground and lift objects on the ground, said teeth being curved upwardly away from the points, a sweep member mounted on said framework above the teeth for rotation over the tops thereof to sweep objects lifted by the digging points upwardly over the teeth, means to collect the objects swept over the teeth, drive means for rotating the sweep member, said teeth comprising alternate fixed teeth and movable teeth, a first cross bar extending through all of said teeth intermediate their ends, the movable teeth being pivoted on the bar, a second cross bar spaced from the first named cross bar and connected to the fixed teeth and the framework, a third cross bar spaced from the first and second bars connected to the movable teeth and the drive means being connected to certain of the movable teeth to rock the movable teeth about the first cross bar as the sweep member rotates.

3. In a machine for picking up objects such as rocks from the ground, a supporting framework, a plurality of spaced apart picking teeth supported on said frame, said teeth having digging points adapted to enter the ground and lift objects on the ground, said teeth being curved upwardly away from the points, a shaft mounted on said framework above the teeth, a sweep member carried by said shaft and rotatable thereby over the teeth to sweep objects lifted by the digging points over the teeth, means to rotate the shaft, said teeth comprising alternate fixed teeth and movable teeth, the movable teeth being pivotally supported on the framework for rocking movement up and down at their digging points, and cam means on said shaft linked to said movable teeth to rock them.

4. In a rock picking machine, a plurality of rock picking teeth arranged side by side in spaced relation, said teeth having front digging points adapted to be pushed under the rocks to be picked up, the teeth extending rearwardly and upwardly from the digging points, a framework carrying said teeth, a cross shaft on said framework above said teeth, means to rotate said shaft, a sweep member mounted on said shaft and rotated thereby over the teeth to sweep rocks picked up by the points rearwardly over the teeth, said sweep member comprising a sweep bar spaced from the shaft, a pair of cross bars fixed to the shaft, a first arm pivoted to the outer end of each cross bar and extending rearwardly, a second arm pivoted to each of the first named arms, the sweep bar being fixed to the second arms, spring means urging the second arms to turn forward in the direction of rotation of the shaft about the first arms, springs urging the first arms outward away from the shaft, stop means limiting the movement of the second arms by said spring means, and stop means limiting the movement of the first arms outward by said springs.

5. The combination defined in claim 4 wherein the stop means limiting the movement of the second arms forward by the spring means comprises flexible members extending from the outer ends of said second arms rearwardly to the first arms, the length of said flexible members being such as to hold the second arms at substantially right angles to the first arms.

6. The combination defined in claim 4 wherein the stop means limiting the outward movement of said first arms comprises rods extending through the cross arms and the first arms, and slidable in the first arms, and nuts threaded on the rods to adjust the amount the first arms may swing outward away from the shaft.

7. In a machine for picking up objects such as rocks from the ground, a supporting framework, a plurality of spaced apart picking teeth supported on said frame, said teeth having digging points adapted to enter the ground and lift objects on the ground, said teeth being curved upwardly away from the points, a shaft mounted on said framework above the teeth, a sweep member carried by said shaft and rotatable thereby over the teeth to sweep objects lifted by the digging points over the teeth, means to rotate the shaft, said teeth comprising alternate fixed teeth and movable teeth, the movable teeth being pivotally supported on the framework for rocking movement up and down at their digging points, and means to rock the movable teeth.

8. In a machine for picking up objects such as rocks from the ground, a supporting framework, a plurality of spaced apart picking teeth supported on said frame, said teeth having digging points adapted to enter the ground and lift objects on the ground, said teeth being curved upwardly away from the points, a shaft mounted on said framework above the teeth, a sweep member carried by said shaft and rotatable thereby over the teeth to sweep objects lifted by the digging points over the teeth, means to rotate the shaft, said teeth comprising alternate fixed teeth and movable teeth, the movable teeth being pivotally supported on the framework for rocking movement up and down at their digging points, and cam means on said shaft linked to said movable teeth to rock them, said sweep member comprising a sweep bar spaced from the shaft, a pair of cross bars fixed to the shaft, a first arm pivoted to the outer end of each cross bar and extending rearwardly, a second arm pivoted to each of the first named arms, the sweep bar being fixed to the second arms, spring means urging the second arms to turn forward in the direction of rotation of the shaft about the first arms, springs urging the first arms outward away from the shaft, stop means limiting the movement of the second arms by said spring means, and stop means limiting the movement of the first arms outward by said springs.

9. In a machine for picking up objects such as rocks from the ground, a supporting framework, a plurality of spaced apart picking teeth supported on said frame, said teeth having digging points adapted to enter the ground and lift objects on the ground, said teeth being curved upwardly away from the points, a sweep member mounted on said framework above the teeth for rotation over the tops thereof to sweep objects lifted by the digging points upwardly over the teeth, means to collect the objects swept over the teeth, drive means for rotating the sweep member, said teeth comprising alternate fixed teeth and movable teeth, a first cross bar extending through all of said teeth intermediate their ends, the movable teeth being pivoted on the bar, a second cross bar spaced from the first named cross bar and connected to the fixed teeth and the framework, a third cross bar spaced from the first and second bars connected to the movable teeth and the drive means being connected to certain of the movable teeth to rock the movable teeth about the first cross bar as the sweep member rotates, said sweep member comprising a sweep bar spaced from the shaft, a pair of cross bars fixed to the shaft, a first arm pivoted to the outer end of each cross bar and extending rearwardly, a second arm pivoted to each of the first named arms, the sweep bar being fixed to the second arms, spring means urging the second arms to turn forward in the direction of rotation of the shaft about the first arms, springs urging the first arms outward away from the shaft, stop means limiting the movement of the second arms by said spring means, and stop means limiting the movement of the first arms outward by said springs.

10. In a machine for picking up objects such as rocks from the ground, a supporting framework, a plurality of spaced apart picking teeth supported on said frame, said teeth having digging points adapted to enter the ground and lift objects on the ground, said teeth being curved upwardly away from the points, a shaft mounted on said framework above the teeth, a sweep member carried by said shaft and rotatable thereby over the teeth to sweep objects lifted by the digging points over the teeth, means to rotate the shaft, said teeth comprising alternate fixed teeth and movable teeth, the movable teeth being pivotally supported on the framework for rocking movement up and down at their digging points, said sweep member comprising a sweep bar spaced from the shaft, a pair of cross bars fixed to the shaft, a first arm pivoted to the outer end of each cross bar and extending rearwardly, a second arm pivoted to each of the first named arms, the sweep bar being fixed to the second arms, spring means urging the second arms to turn forward in the direction of rotation of the shaft about the first arms, and springs urging the first arms outward away from the shaft.

References Cited in the file of this patent

UNITED STATES PATENTS

| 2,489,516 | Booth | Nov. 29, 1949 |
| 2,504,459 | Schneider et al. | Apr. 18, 1950 |
| 2,618,111 | Egstad | Nov. 18, 1952 |